United States Patent
Zhao et al.

(10) Patent No.: US 10,536,980 B2
(45) Date of Patent: Jan. 14, 2020

(54) METHOD, DEVICE AND SYSTEM FOR INTERACTING LINK INFORMATION

(71) Applicant: China Academy of Telecommunications Technology, Beijing (CN)

(72) Inventors: Yali Zhao, Beijing (CN); Jiamin Liu, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 233 days.

(21) Appl. No.: 14/780,975

(22) PCT Filed: Apr. 2, 2014

(86) PCT No.: PCT/CN2014/074622
§ 371 (c)(1),
(2) Date: Sep. 28, 2015

(87) PCT Pub. No.: WO2014/161486
PCT Pub. Date: Oct. 9, 2014

(65) Prior Publication Data
US 2016/0066351 A1    Mar. 3, 2016

(30) Foreign Application Priority Data

Apr. 3, 2013 (CN) .......................... 2013 1 0116364

(51) Int. Cl.
*H04W 76/10* (2018.01)
*H04W 76/14* (2018.01)
(Continued)

(52) U.S. Cl.
CPC .......... *H04W 76/10* (2018.02); *H04W 8/005* (2013.01); *H04W 24/02* (2013.01); *H04W 76/14* (2018.02); *H04W 88/04* (2013.01); *H04W 92/18* (2013.01)

(58) Field of Classification Search
CPC ............. H04W 24/02; H04W 28/0247; H04W 76/023; H04W 92/18
See application file for complete search history.

(56) References Cited

U.S. PATENT DOCUMENTS

| 9,521,536 B2* | 12/2016 | Fodor | H04W 8/005 |
| 2012/0106517 A1* | 5/2012 | Charbit | H04W 72/04 370/336 |

(Continued)

FOREIGN PATENT DOCUMENTS

| CN | 102388666 | 3/2012 |
| CN | 102422703 | 4/2012 |

(Continued)

OTHER PUBLICATIONS

"LTE; Evolved Universal Terrestrial Radio Access (E-UTRA); Medium Access Control (MAC) protocol specification (3GPP TS 36.321 version 11.2.0 Release 11)",Technical Specification, European Telecommunications Standards Institute (ETSI), 650, Route Des Lucioles ; F-06921 Sophia-Antipolis ; France, vol. 3GPP RAN 2, No. V11.2.0,XP014156763, DTD Apr. 1, 2013.

(Continued)

*Primary Examiner* — Ayaz R Sheikh
*Assistant Examiner* — Debebe A Asefa
(74) *Attorney, Agent, or Firm* — Foley & Lardner LLP (57) ABSTRACT

A method, device and system for interacting link information, which are used for solving the problem that at present there is no solution for a network side to learn the link information about a terminal supporting D2D communications and how to distinguish D2D link information from D2N link information. A link information reporting method in the embodiments of the present invention comprises: a terminal supporting D2D communications determining link information which is required to be reported to a network side, wherein the link information comprises D2D link information and/or D2N link information; and the terminal sending the determined link information to the network side on a D2N link, and indicating a link corresponding to the link information to the network side. Using the method in the embodiments of the present invention enables the network side to learn the link information about the terminal supporting the D2D communications and to distinguish whether the received link information is for the D2D link or the D2N link, so that the network side can more accurately manage and schedule the D2D link and the D2N link.

18 Claims, 5 Drawing Sheets

(51) Int. Cl.
*H04W 8/00* (2009.01)
*H04W 24/02* (2009.01)
*H04W 92/18* (2009.01)
*H04W 88/04* (2009.01)

(56) References Cited

U.S. PATENT DOCUMENTS

2013/0322276 A1\* 12/2013 Pelletier .............. H04W 72/085
 370/252
2016/0014835 A1\* 1/2016 Wu ....................... H04W 8/005
 370/329

FOREIGN PATENT DOCUMENTS

| CN | 102457929 A | 5/2012 |
| CN | 102547984 | 7/2012 |
| CN | 102638893 | 8/2012 |
| CN | 102984694 A | 3/2013 |
| WO | WO-2012/144320 A1 | 10/2012 |

OTHER PUBLICATIONS

International Search Report for PCT/CN2014/074622 dated Jul. 7, 2014.

\* cited by examiner

METHOD, DEVICE AND SYSTEM FOR INTERACTING LINK INFORMATION

This application is a US National Stage of International Application No. PCT/CN2014/074622, filed on Apr. 2 2014, designating the United States, and claiming the benefit of Chinese Patent Application No. 201310116364.1, filed with the State Intellectual Property Office of People's Republic of China on Apr. 3, 2013 and entitled "Method, device and system for exchanging link information", which is hereby incorporated by reference in its entirety.

FIELD

The present invention relates to the field of communications and particularly to a method, device and system for exchanging link information.

BACKGROUND

In a Long Term Evolution (LTE) system, centralized control of a communication network is currently adopted, that is, both uplink and downlink data of a User Equipment (UE) need to be controlled by the network to be transmitted and received. At present, communication between one UE and another UE is forwarded and controlled by the network, and there is no direct communication link between the UE and the other UE. In this scheme, data transmission between the UE and the network can be referred simply to as Device to Network (D2N) transmission, as illustrated in FIG. 1.

In future development of a mobile communication system, in order to better satisfy the demand of a user and to improve the efficiency of exchanging information between devices, a mechanism of a Device to Device (D2D) discovery and even Device to Device (D2D) communication between the mobile devices has been introduced. In a D2D communication mode, some Device to Device (D2D) communication is allowed between one UE and another UE, and the direct communication link can be established under the control or assistance by the network, as illustrated in FIG. 2. D2D communication between the UE and the other UE is based upon a discovery of a UE nearby.

In the existing LTE system, a UE only supports D2N transmission, so the UE can only report information related to a D2N link to the network side so that the network side will make a correct decision according to the D2N link information reported by the UE. With the introduction of D2D, a UE supporting D2D transmission shall also support D2N transmission, and even the same UE may perform D2D transmission and D2N transmission at the same time. Since D2D transmission also needs to be controlled by the network, it shall be considered how to enable the network side to know D2D link information and to distinguish the D2D link information from the D2N link information, so that the network side can manage and schedule the D2D link and the D2N link. However there has been absent so far a solution to enabling the network side to know link information of a UE supporting D2D communication and to distinguish D2D link information from D2N link information.

In summary there has been absent so far a solution to enabling the network side to know link information of a UE supporting D2D communication and to distinguish D2D link information from D2N link information.

SUMMARY

Embodiments of the invention provide a method, device and system for exchanging link information so as to address such a problem in the prior art that there has been absent so far a solution to enabling the network side to know link information of a UE supporting D2D communication and to distinguish D2D link information from D2N link information.

An embodiment of the invention provides a method for reporting link information, the method including:

determining, by a UE supporting Device to Device (D2D) communication, link information, comprising D2D link information and/or Device to Network (D2N) link information, to be reported to the network side; and sending, by the UE, the determined link information to the network side over a D2N link, and indicating a link corresponding to the link information to the network side.

An embodiment of the invention provides a method for receiving link information, the method including:

receiving, by the network side, link information reported by a UE supporting D2D communication, and determining a link corresponding to the link information, wherein the link information comprises D2D link information and/or D2N link information; and managing and scheduling, by the network side, the link corresponding to the link information according to the link information.

An embodiment of the invention provides a UE including:

a first processing module configured to determine link information, comprising D2D link information and/or Device to Network (D2N) link information, to be reported to the network side; and a second processing module configured to send the determined link information to the network side over a D2N link, and to indicate a link corresponding to the link information to the network side.

An embodiment of the invention provides a network-side device including:

a determining module configured to receive link information reported by a UE supporting D2D communication, and to determine a link corresponding to the link information, wherein the link information comprises D2D link information and/or D2N link information; and a managing module configured to manage and schedule the link corresponding to the received link information according to the link information.

An embodiment of the invention provides a communication system including:

a UE configured to determine link information to be reported to a network-side device; to send the determined link information to the network-side device over a D2N link; and to indicate a link corresponding to the link information to the network-side device; and the network-side device configured to receive the link information reported by the UE supporting D2D communication; to determine the link corresponding to the link information;

and to manage and schedule the link corresponding to the link information according to the link information;

wherein the link information comprises D2D link information and/or D2N link information.

Another embodiment of the invention provides a UE including a transceiver, a memory, and a processor;

the memory is configured to store one or more executable programs configured to configure the processor; and the processor is configured with the one or more executable programs, where the one or more executable programs are executed to perform a following method:

determining link information, comprising D2D link information and/or Device to Network (D2N) link information, to be reported to the network side; and sending the determined link information to the network side over a D2N link through the transceiver, and indicating a link corresponding to the link information to the network side.

Another embodiment of the invention provides a network-side device including a transceiver, a memory, and a processor;

the memory is configured to store one or more executable programs configured to configure the processor; and the processor is configured with the one or more executable programs, wherein the one or more executable programs are executed to perform a following method:

receiving link information reported by a UE supporting D2D communication through the transceiver, and determining a link corresponding to the link information, wherein the link information comprises D2D link information and/or D2N link information; and managing and scheduling the link corresponding to the link information according to the link information.

In the embodiments of the invention, a UE determines link information to be reported to a network-side device; and sends the determined link information to the network-side device over a D2N link, and indicates a link corresponding to the link information to the network-side device. Since the link information includes D2D link information and/or D2N link information, the network side can know the link information of the UE supporting D2D communication; and since the UE sending the link information to the network side indicates that the link information relates to a D2D link or the D2N link, the network side can distinguish the D2D link information from the D2N link information upon reception of the link information, so that the network side can manage and schedule the D2D link and the D2N link more accurately.

BRIEF DESCRIPTION OF THE DRAWINGS

In order to make the technical solutions according to the embodiments of the invention more apparent, the drawings to which reference will be made in the description of the embodiments will be described below briefly, and apparently the drawings described below are illustrative only some of the embodiments of the invention, and those ordinarily skilled in the art can further derive other drawings from these embodiments here without any inventive effort. In the drawings:

FIG. 1 illustrates the communication scheme of centralized control by the network in the LTE system in the prior art;

FIG. 2 illustrates a schematic diagram of the D2D discovery or D2D communication in the prior art;

FIG. 3 illustrates a schematic diagram of a method for reporting link information according to an embodiment of the invention;

FIG. 4 illustrates a schematic diagram of a format of a BSR MAC CE according to an embodiment of the invention;

FIG. 5 illustrates a schematic diagram of a method for receiving link information according to an embodiment of the invention;

FIG. 6 illustrates a schematic structural diagram of a UE according to an embodiment of the invention;

FIG. 7 illustrates a schematic structural diagram of a network-side device according to an embodiment of the invention;

FIG. 8 illustrates a schematic structural diagram of a communication system according to an embodiment of the invention;

FIG. 9 illustrates a schematic structural diagram of a UE according to another embodiment of the invention; and FIG. 10 illustrates a schematic structural diagram of a network-side device according to another embodiment of the invention.

DETAILED DESCRIPTION OF THE EMBODIMENTS

In order to make the objects, technical solutions and advantages of the invention more apparent, the invention will be described below in further details with reference to the drawings, and apparently the embodiments described below are only some but not all of the embodiments of the invention. All the other embodiments which can occur to those ordinarily skilled in the art based upon the embodiments here of the invention without any inventive effort shall fall into the scope of the invention as claimed.

In the embodiments of the invention, a UE determines link information, including D2D link information and/or D2N link information, to be reported to a network-side device; and sends the determined link information to the network-side device over a D2N link, and indicates a link corresponding to the link information to the network-side device, to thereby address the problem above.

The embodiments of the invention will be described below in further details with reference to the drawings of the invention.

Figure 1:
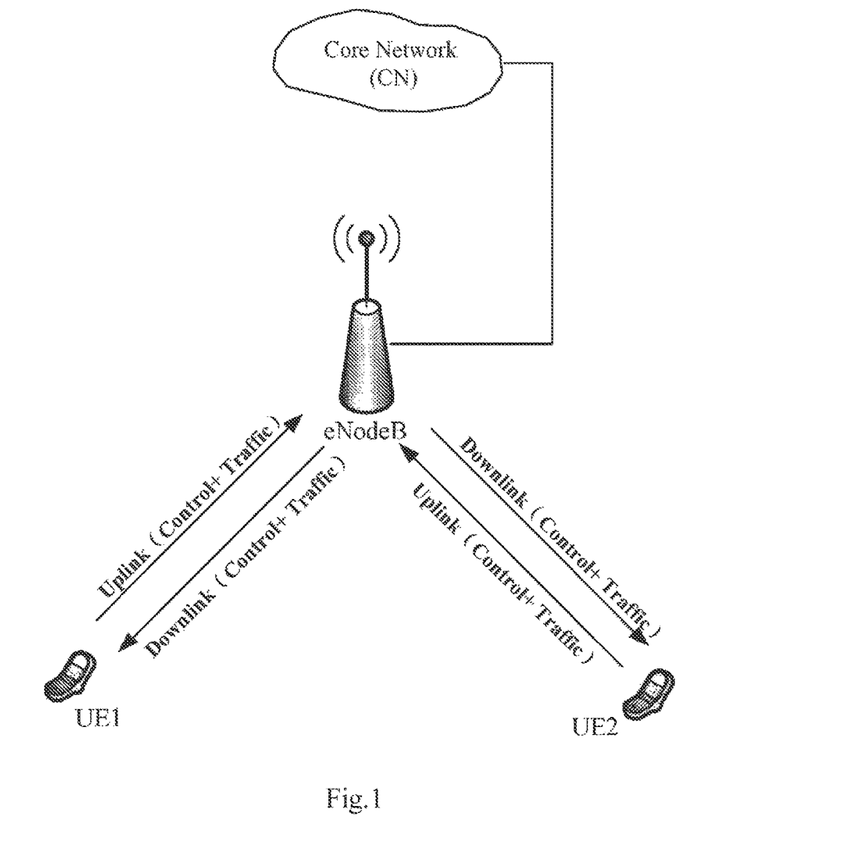
Figure 2:
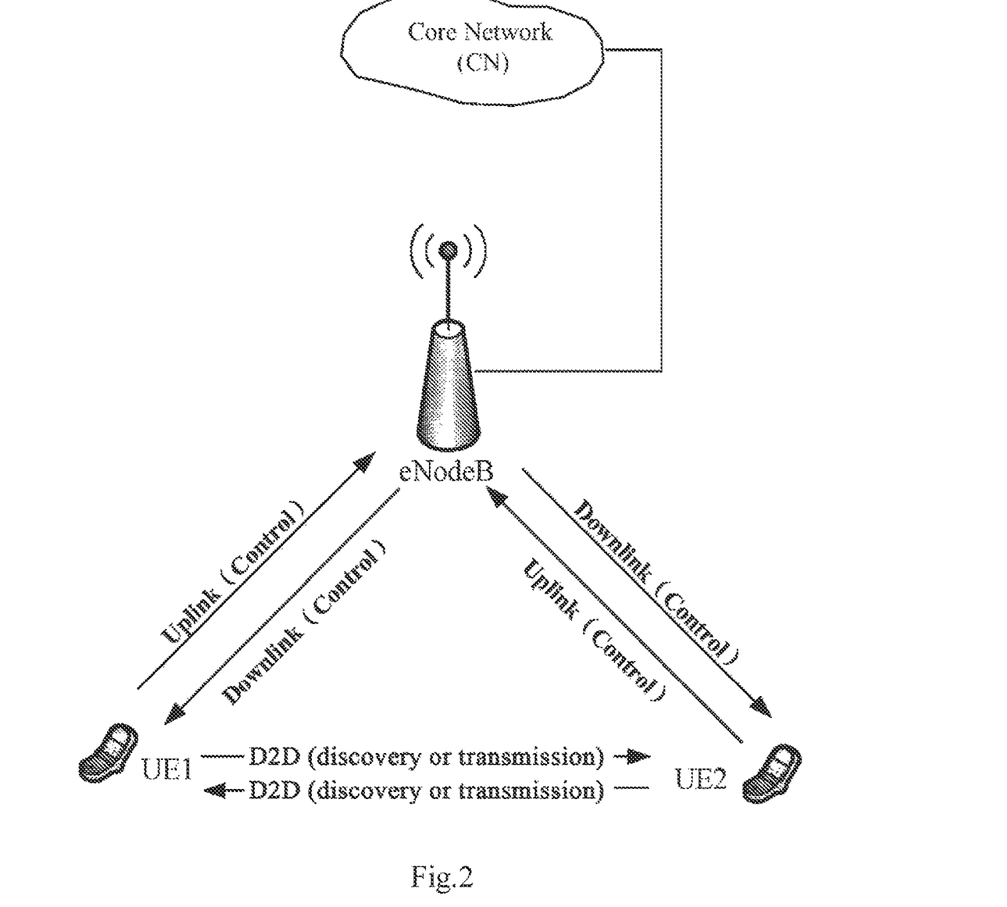
Figure 3:
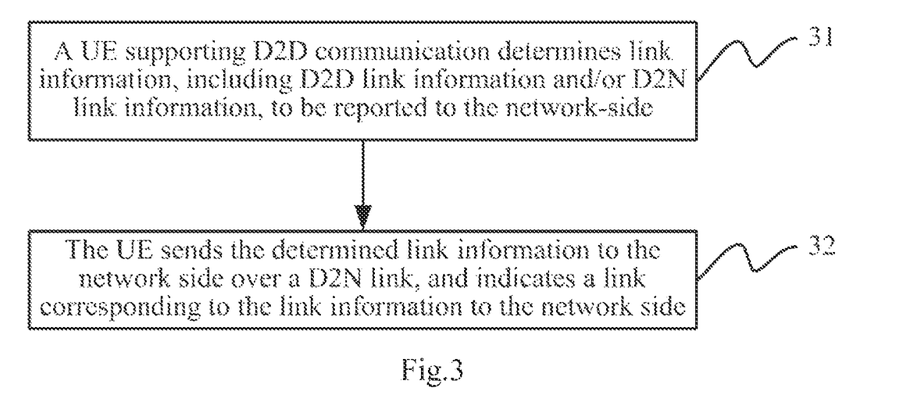

Referring to FIG. 3, a method for reporting link information according to an embodiment of the invention includes the following operations:

Operation 31: a UE supporting D2D communication determines link information, including D2D link information and/or D2N link information, to be reported to a network-side; and Operation 32; the UE sends the determined link information to the network side over a D2N link, and indicates a link corresponding to the link information to the network side.

The UE as referred to in the embodiment of the invention is a UE supporting both D2D communication and D2N communication, and with at least one D2D link.

In the embodiment of the invention, since the UE sending the link information to the network side indicates that the link information relates to a D2D link or the D2N link, the network side can distinguish the D2D link information from the D2N link information upon reception of the link information, so that the network side can manage and schedule the D2D link and the D2N link more accurately.

In the embodiment of the invention, the D2D link information refers to information related to the D2D link of the UE, including at least one or a combination of the following:

Buffer State (BS) information, Channel State Information (CSI), Scheduling Request (SR) information, Power Headroom (PH) information, configuration information, and scheduling information;

Particularly the configuration information related to the D2D link includes at least one or a combination of the following:

Channel configuration information, antenna pattern configuration information, Media Access Control (MAC) layer parameter configuration information, and physical layer parameter configuration information.

In the embodiment of the invention, the D2N link information refers to information related to the D2N link of the UE, including at least one or a combination of the following:

BS information, CSI, SR information, PH information, configuration information, and scheduling information;

Particularly the configuration information related to the D2N link includes at least one or a combination of the following:

Channel configuration information, antenna pattern configuration information, MAC layer parameter configuration information, and physical layer parameter configuration information.

In an implementation, the network side (e.g., an eNB) configures the UE in explicit signaling to perform D2D transmission and/or D2N transmission; and correspondingly the UE decides from the explicit indication of the network side to perform D2D transmission and/or D2N transmission.

It shall be noted that the network side needs to firstly know that the UE supports D2D communication, before configuring the UE to perform D2D transmission. Preferably the UE reports UE capability indication information to the network side by indicating to the network side in the UE capability indication information that the UE supports D2D communication. Correspondingly the network side determines from the UE capability indication information reported by the UE that the UE supports D2D communication, upon reception of the UE capability indication information, so that the network side can configure the UE to perform D2D transmission, and the network side can also configure a resource, etc., for D2D transmission by the UE.

In the embodiment of the invention, the UE may only perform D2D transmission or may only perform D2N transmission or may perform both D2D transmission and D2N transmission.

In an implementation, the UE determines from the explicit indication of the network side whether to exchange the D2D link information and/or the D2N link information with the network side.

For example, if the network side configures the UE to only perform D2N transmission, then the UE will exchange only the D2N link information with the network side; if the network side configures the UE to perform both D2D transmission and D2N transmission, then the UE will exchange both the D2D link information and the D2N link information with the network side; and if the network side configures the UE to only perform D2D transmission, then the UE will exchange only the D2D link information with the network side.

In an implementation, in the operation 31, if the UE needs to report the D2D link information and the D2N link information to the network side, then the UE can determine the link information to be reported to the network side in the following approaches:

In a first approach, the UE determines the D2D link information and the D2N link information to be reported respectively for the D2D link and the D2N link.

In this approach, correspondingly in the operation 32, the UE reports the D2D link information and the D2N link information respectively to the network side over the D2N link.

For example, the UE determines whether a Buffer State Report (BSR)/Power Headroom Report (PHR) trigger condition is satisfied respectively for the D2D link and the D2N link, and if so, then the UE reports the BSR/PHR of the D2D link, and the BSR/PHR of the D2N link respectively to the network side.

In another example, the UE determines the CSI of the D2D link according to its measurement result on the D2D link; the UE determines the CSI of the D2N link according to its measurement result on the D2N link; and the UE reports the CSI of the D2D link, and the CSI of the D2N link to the network side over different resources.

In a second approach, the UE determines the D2D link information and the D2N link information to be reported respectively for the D2D link and the D2N link, and reports the determined D2D link information and D2N link information together to the network side.

Particularly the UE can package and report the D2D link information and the D2N link information.

In this approach, correspondingly in the operation 32, the UE reports the link information, including the D2D link information and the D2N link information, to the network side over the D2N link.

For example, the UE determines whether a BSR/PHR trigger condition is satisfied respectively for the D2D link and the D2N link, and if so, then the UE packages a BSR/PHR of the D2D link, and a BSR/PHR of the D2N link into a Media Access Control (MAC) Control Element (CE), and reports the MAC CE to the network side.

In an implementation, the UE can indicate the link corresponding to the link information to the network side in the operation 32 in any one of the following approachs:

In an approach A, the UE indicates the link corresponding to the link information to the network side using indication information carried in the link information.

Particularly if the UE reports the D2D link information to the network side, then the UE carries the indication information in the D2D link information to indicate to the network side that the link corresponding to the link information is the D2D link; and if the UE reports the D2N link information to the network side, then the UE carries the indication information in the D2N link information to indicate to the network side that the link corresponding to the link information is the D2N link.

In another implementation, if the link information reported by the UE to the network side includes only the D2D link information (or the D2N link information), then the UE can indicate the link corresponding to the link information dependent upon whether the link information carries indication information.

Particularly if the link information does not carry any indication information to indicate the link, then the link corresponding to the link information is the D2D link by default; and if the link information carries indication information to indicate the link, then the link corresponding to the link information is the D2N link by default.

Furthermore if the UE packages and reports the D2D link information and the D2N link information to the network side, then the UE carries indication information in the link information to indicate that which part of the link information is the D2D link information, and which part of the link information is the D2N link information.

For example, if the D2D link information and the D2N link information is invariable in length, then the D2D link information and the D2N link information can be packaged by packaging them in an invariable order, and can be distinguished from each other by their positions; and if the D2D link information and the D2N link information is variable in length, then the length of the respective link information (i.e., the D2D link information and the D2N link information) can be indicated explicitly.

In the first approach A, the UE can represents the indication information in bits reserved in the link information, for example, the UE can indicate in a bit whether the link information relates to the D2D link or the D2N link (for example, "0" indicates the D2D link, and "1" indicates the D2N link); or the UE can represent the indication information in an information field newly added in the link information.

Furthermore if there are at least two D2D links of the UE, and the link indicated by the indication information is the D2D link, then the indication information further carries the index of the D2D link to indicate to the network side to which of the D2D links the link information relates.

In an implementation, the index of the D2D link can be configured when the D2D link is established.

In a second approach B, the UE indicates the link corresponding to the link information to the network side using a resource over which the link information is carried.

Particularly the UE sends the D2D link information over a first resource allocated by the network side for a D2D link of the UE, and the D2N link information over a second resource allocated by the network side for the D2N link of the UE.

By way of an example, if the network side configures the UE with a resource A over which the D2D link information is transmitted, and a resource B over which the D2N link information is transmitted, then:

If the UE determines the D2D link information to be transmitted, then the UE transmits the determined D2D link information to the network side over the resource A; and correspondingly if the network side receives the link information of the UE over the resource A, then the network side determines that the link information corresponds to the D2D link; and If the UE determines the D2N link information to be transmitted, then the UE transmits the determined D2N link information to the network side over the resource B; and correspondingly if the network side receives the link information of the UE over the resource B, then the network side determines that the link information corresponds to the D2N link.

Furthermore if the UE is provided with at least two D2D links, then the index of each of the D2D links is further carried over the second resource configured by the network side for the UE to indicate to which of the D2D links the second resource relates.

In an implementation, the index of the D2D link can be configured when the D2D link is established.

In the embodiment of the invention, the first resource includes one or a combination of the following: a time-domain resource, a frequency-domain resource, a space-domain resource, and a code-domain resource.

In the embodiment of the invention, the second resource includes one or a combination of the following: a time-domain resource, a frequency-domain resource, a space-domain resource, and a code-domain resource.

In an implementation, for the BS information of the D2D link and/or the D2N link:

If the UE determines that the BSR trigger condition of the D2D link and/or the D2N link is satisfied and that there is an uplink resource for the D2D link, then the UE reports the BSR of the D2D link and/or the D2N link to the network side in an MAC CE, and indicates the link corresponding to the BSR to the base station using the BSR in the MAC CE (denoted as a BSR MAC CE).

In an implementation, the BSR trigger condition of the D2D link includes:

A D2D link regular BSR trigger condition, a D2D link periodic BSR trigger condition, and a D2D link padding BSR trigger condition.

Here the D2D link regular BSR trigger condition includes that if a buffer area corresponding to the D2D link is changed from being empty to being not empty or there are arriving data at a higher priority, then a BSR report of the D2D link is triggered; or if a retransmission BSR timer retxBSR-Timer corresponding to the D2D link expires and there are data in a buffer area corresponding to the D2D link, then a BSR report of the D2D link is triggered.

The D2D link periodic BSR trigger condition includes that if a BSR periodic report timer periodicBSR-Timer of the D2D link expires, then a periodic BSR report of the D2D link is triggered.

The D2D link padding BSR trigger condition includes that if there is an available resource in addition to data to be transmitted when the UE composes a Media Access Control (MAC) Packet Data Unit (PDU) of the D2D link, then a padding BSR report of the D2D link is triggered.

In an implementation, the BSR trigger condition of the D2N link includes a D2N link regular BSR trigger condition, a D2N link periodic BSR trigger condition, and a D2N link padding BSR trigger condition.

Here the D2N link regular BSR trigger condition includes that if a buffer area corresponding to the D2N link is changed from being empty to being not empty or there are arriving data at a higher priority, then a BSR report of the D2N link is triggered; or if a retransmission BSR timer retxBSR-Timer corresponding to the D2N link expires and there are data in a buffer area corresponding to the D2N link, then a BSR report of the D2N link is triggered.

The D2N link periodic BSR trigger condition includes that if a BSR periodic report timer periodicBSR-Timer of the D2N link expires, then a periodic BSR report of the D2N link is triggered.

The D2N link padding BSR trigger condition includes that if there is an available resource in addition to data to be transmitted when the UE composes a Media Access Control (MAC) Packet Data Unit (PDU) of the D2N link, then a padding BSR report of the D2N link is triggered.

Furthermore the UE can send the BS information of the D2D link and the D2N link in any one of the following approaches upon determining that the BSR trigger conditions of the D2D link and the D2N link are satisfied and there is an uplink resource for the D2N link:

The UE reports the BSRs corresponding to the D2D link and the D2N link to the base station in an MAC CE, and indicates the links corresponding to the BSRs to the base station using the BSRs in an MAC CE (that is, they are packaged and reported); or The UE reports the BSRs corresponding to the D2D link and the D2N link to the base station separately in respective MAC CEs, and indicates the links corresponding to the BSRs to the base station in the respective MAC CEs (that is, they are reported separately).

Furthermore the UE can indicate the link corresponding to the BSR to the base station using the BSR in the MAC CE in the following two approaches:

In a first approach, the UE indicates the link corresponding to the BSR in an MAC sub-header corresponding to the BSR in the MAC CE, or in reserved bits in the MAC CE.

Figure 4:
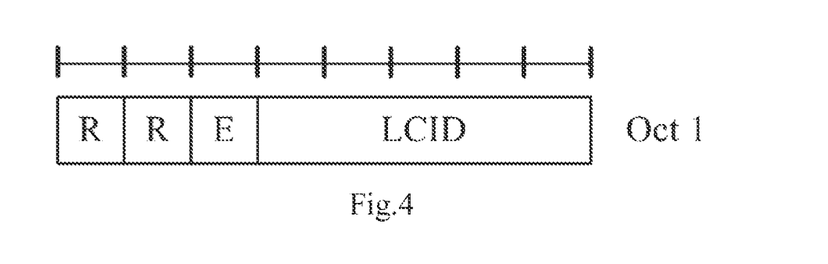

Particularly by way of an example in which the link is indicated in the MAC sub-header of the MAC CE, FIG. 4 illustrates a format of the MAC sub-header of the MAC CE including respective fields defined as follows: R represents a reserved bit; E represents an extended bit to indicate whether a next byte belongs to the MAC sub-header or a payload; and a Logical Channel ID (LCID) identifies a logical channel number corresponding to the payload. An R bit can be selected in the BSR in the MAC CE to identify the link to which the BSR relates, for example, R being "1" indicates that the BSR MAC CE relates to the D2D link, and R being "0" indicates that the BSR MAC CE relates to the D2N link.

In a second approach, the UE indicates the link corresponding to the BSR in an LCID field in an MAC sub-header corresponding to the BSR in the MAC CE.

Particularly a new LCID is introduced to the BSR MAC CE of the D2D link, and the value of the LCID field in the MAC sub-header corresponding to the BSR MAC CE can indicate whether the BSR MAC CE relates to the D2D link or the D2N link.

Furthermore if there are at least two D2D links of the UE, and the link indicated by the indication information is the D2D link, then the indication information will further indicate to which of the D2D links the indication information relates.

By way of an example, if there are one D2N link and two D2D links of the UE, then in the first approach, the UE can indicate the link corresponding to the link information in two R bits in the MAC CE sub-header, for example, a value of "00" indicates the D2N link, a value of "01" indicates the first D2D link, and "11" indicates the second D2D link, where the index of the D2D link can be allocated when the D2D link is established.

In an implementation, the UE determines the BS information of the D2D link, and composes the BSR MAC CE of the D2D link, only according to the data amount of data and control information in its buffer area to be transmitted over the D2D link; and/or, the UE determines the BS information of the D2N link, and composes the BSR MAC CE of the D2N link, only according to the data amount of data and control information in its buffer area to be transmitted over the D2N link.

Furthermore if the UE needs to report the CSI of the D2D link, then the UE determines the CSI of the D2D link according to a measurement result of the D2D link. Preferably the UE carries indication information in the determined CSI of the D2D link to indicate that the CSI relates to the D2D link.

Figure 5:
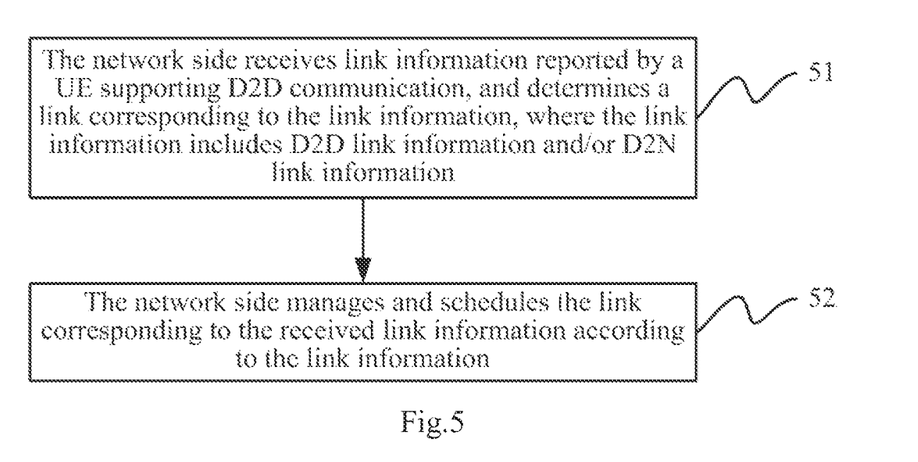

Further to the embodiment above, an embodiment of the invention further provides a method for receiving link information, as illustrated in FIG. 5, where the method includes the following operations:

Operation 51: a network side receives link information reported by a UE supporting D2D communication, and determines a link corresponding to the link information, where the link information includes D2D link information and/or D2N link information; and Operation 52: the network side manages and schedules the link corresponding to the received link information according to the link information.

The UE as referred to in the embodiment of the invention is a UE supporting both D2D communication and D2N communication, and with at least one D2D link.

In the embodiment of the invention, the D2D link information includes at least one or a combination of the following:

BS information, CSI, SR information, PH information, configuration information, and scheduling information;

Particularly the configuration information related to the D2D link includes at least one or a combination of the following:

Channel configuration information, antenna pattern configuration information, MAC layer parameter configuration information, and physical layer parameter configuration information.

In the embodiment of the invention, the D2N link information includes at least one or a combination of the following:

BS information, CSI, SR information, PH information, configuration information, and scheduling information;

Particularly the configuration information related to the D2N link includes at least one or a combination of the following:

Channel configuration information, antenna pattern configuration information, MAC layer parameter configuration information, and physical layer parameter configuration information.

In an implementation, the network side (e.g., a base station) configures the UE in explicit signaling to perform D2D transmission and/or D2N transmission; and Correspondingly the UE decides from the explicit indication of the network side to perform D2D transmission and/or D2N transmission.

It shall be noted that the network side needs to firstly know that the UE supports D2D communication, before configuring the UE to perform D2D transmission; and Preferably the UE reports UE capability indication information to the network side and indicates to the network side in the UE capability indication information that the UE supports D2D communication.

Correspondingly the network side determines from the UE capability indication information reported by the UE that the UE supports D2D communication, upon reception of the UE capability indication information, so that the network side can configure the UE to perform D2D transmission, and the network side can also configure a resource, etc., for D2D transmission by the UE.

In the embodiment of the invention, the UE may only perform D2D transmission or may only perform D2N transmission or may perform both D2D transmission and D2N transmission.

In an implementation, the network side can determine the link corresponding to the received link information in the operation 51 in any one of the following approaches:

The network side determines the link corresponding to the link information according to indication information carried in the link information; and The network side determines the link corresponding to the link information according to a resource over which the link information is carried, where the network side allocates a first resource for the D2D link of the UE, and a second resource for the D2N link of the UE;

Particularly if the network side receives the link information over the first resource, then the network side determines that the link information relates to the D2D link; and if the network side receives the link information over the second resource, then the network side determines that the link information relates to the D2N link.

Furthermore if there are at least two D2D links of the UE, and the link indicated by the indication information is the D2D link, then the indication information further carries the index of the D2D link; or if there are at least two D2D links of the UE, then for each D2D link, the index of the D2D link is further carried over the first resource configured by the network side for the UE.

Since the network side determines the link corresponding to the link information in the same approaches as the approach A and the approach B above at the UE side, reference can be made to the description of the approach A and the approach B for details thereof, so a repeated description thereof will be omitted here.

In the embodiment of the invention, the first resource includes one or a combination of the following: a time-domain resource, a frequency-domain resource, a space-domain resource, and a code-domain resource.

In the embodiment of the invention, the second resource includes one or a combination of the following: a time-domain resource, a frequency-domain resource, a space-domain resource, and a code-domain resource.

In an implementation, if the link information includes the BS information, then the network side receives a BSR reported by the UE in an MAC CE, and determines the link corresponding to the BSR from the BSR in the MAC CE.

Furthermore the network side can determine the link corresponding to the BSR from the BSR in the MAC CE in the following two approaches:

The network side determines the link corresponding to the BSR from an MAC sub-header corresponding to the BSR in the MAC CE, or reserved bits in the MAC CE; or The network side determines the link corresponding to the BSR from an LCID field in an MAC sub-header corresponding to the BSR in the MAC CE.

Since the network side determines the link corresponding to the BSR from the BSR in the MAC CE in the same approaches as the first approach and the second approach above at the UE side, reference can be made to the description of the first approach and the second approach for details thereof, so a repeated description thereof will be omitted here.

It shall be noted that the UE can indicate the link corresponding to the link information, and the network side can determine the link corresponding to the link information, particularly in one of the approaches, which can be determined and then configured by the network side to the UE in higher-layer signaling, or which can be negotiated about between or prescribed by the UE and the network side, or specified in a protocol.

Two particular embodiments will be presented below for a description of exchanging information between the UE and the network side according to the embodiments of the invention.

In a first embodiment, a BSR will be exemplified for a description of link indication information being carried explicitly in exchanged information between the UE and the network side.

If the base station configures in explicit signaling the UE to perform D2D transmission, and there is D2D transmission for the UE, then:

Firstly the UE determines respectively for a D2D link and a D2N link, according to a BSR trigger condition of the respective link, whether there is a BSR triggered for the corresponding link; and if there is a BSR triggered for the D2D link and/or the D2N link, and there is an uplink resource of the D2N link, then the UE performs the BSR, where link indication information is carried explicitly in report information of the BSR.

Particularly the link indication information can be carried in a BSR MAC CE or an MAC sub-header corresponding to the BSR MAC CE.

For example, if the link indication information is carried in the MAC sub-header corresponding to the BSR MAC CE, then there are two approaches:

In a first approach, an R bit can be selected in the sub-header of the BSR MAC CE and the value of the R bit can be used to identify the link to which the BSR MAC CE relates, for example, a value of "1" indicates that the BSR MAC CE relates to the D2D link, and a value of "0" indicates that the BSR MAC CE relates to the D2N link.

In a second approach, a new LCID is introduced to the BSR MAC CE of the D2D link, and the value of the LCID field in the MAC sub-header corresponding to the BSR MAC CE can indicate whether the BSR MAC CE relates to the D2D link or the D2N link.

It shall be noted that this embodiment has been described taking one D2D link and one D2N link as an example, and if there are more than one D2D link and one D2N link, then the explicit indication information will further indicate to which of the D2D links the link information relates, for example, if there are one D2N link and two D2D links, then two R bits can be used for indication in the first approach, for example, if the both of the R bits are "0", then they indicate the D2D link; if they are "01", then they indicate the first D2D link; and if they are "11", then they indicate the second D2D link, where the index of the D2D link can be allocated when the D2D link is established.

In a second embodiment, the an SR will be exemplified for a description of link information corresponding to a D2D link and a D2N link, which is distinguished from each other by dividing the frequency-domain resources, and the same will apply to link information of different links, which is distinguished from each other by dividing other resources, so a repeated description thereof will be omitted here.

In the existing Release 8 (R8), a resource configuration Information Element (IE) for transmission of an SR is defined as follows:

```
SchedulingRequestConfig ::=   CHOICE {
    release                       NULL,
    setup                         SEQUENCE {
        sr-PUCCH-ResourceIndex    INTEGER (0..2047),
        sr-ConfigIndex            INTEGER (0..157),
        dsr-TransMax              ENUMERATED {
                                  n4, n8, n16, n32, n64, spare3,
                                  spare2, spare1}
    }
}
```

Where:
sr-PUCCH-ResourceIndex indicates a PUCCH resource over which an SR is sent by the UE; and
sr-ConfigIndex indicates a periodicity and a sub-frame offset of the SR resource.

If the base station configures the UE in explicit signaling to perform D2D transmission, and there is D2N transmission for the UE, then the base station can configure the UE with an SR resource by configuring different resources respectively for the D2D link and the D2N link, for example, the SR resources can be configured as follows:

```
SchedulingRequestConfig ::=   CHOICE {
    release                       NULL,
    setup                         SEQUENCE {
        sr-PUCCH-ResourceIndex    INTEGER (0..2047),
        sr-ConfigIndex            INTEGER (0..157),
        dsr-TransMax              ENUMERATED {
                                  n4, n8, n16, n32, n64, spare3,
                                  spare2, spare1}
    }
}
```

The above configuration identifies the SR resource available to the D2N link; and

```
SchedulingRequestConfig-v12 ::= CHOICE {
    release                       NULL,
    setup                         SEQUENCE {
        sr-PUCCH-ResourceIndex-r12  INTEGER (0..2047),
        sr-ConfigIndex-r12          INTEGER (0..157),
```

-continued

```
    dsr-TransMax-r13           ENUMERATED {
                               n4, n8, n16, n32, n64, spare3,
                               spare2, spare1}
    }
}
```

The above configuration identifies the SR resource available to the D2D link.

Correspondingly the UE receives the configuration information above, and if there is an SR triggered for the D2N link, then the UE sends the scheduling request for the D2N link over the SR resource corresponding to the D2N link; and if there is an SR triggered for the D2D link, then the UE sends the scheduling request for the D2D link over the SR resource corresponding to the D2D link, so that the base station can determine from the resource over which the SR transition is received whether a PUSCH resource will be allocated for the D2N link or the D2D link.

It shall be noted that this embodiment has been described taking one D2D link and one D2N link as an example, and if there are more than one D2D link and one D2N link, then the resources will be configured by further carrying the index of the D2D link to indicate to which of the D2D links the resource relates, where the index of the D2D link can be allocated when the D2D link is established.

The process flows of the methods above can be performed in software program which can be stored in a storage medium, and the stored software program can perform the operations of the methods above upon being invoked.

Based upon the same inventive idea, an embodiment of the invention further provides a UE, and since the UE addresses the problem under the same principle as the method above for reporting link information, reference can be made to the implementation of the method for an implementation of the UE, so a repeated description thereof will be omitted here.

Figure 6:
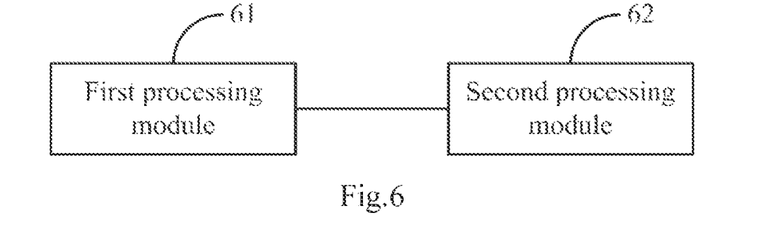

Referring to FIG. 6, a UE according to an embodiment of the invention includes:

A first processing module 61 is configured to determine link information, including D2D link information and/or Device to Network (D2N) link information, to be reported to the network side; and A second processing module 62 is configured to send the determined link information to the network side over a D2N link, and to indicate a link corresponding to the link information to the network side.

In the embodiment of the invention, the D2D link information includes at least one or a combination of the following:

BS information, CSI, SR information, PH information, configuration information, and scheduling information;

Particularly the configuration information related to the D2D link includes at least one or a combination of the following:

Channel configuration information, antenna pattern configuration information, MAC layer parameter configuration information, and physical layer parameter configuration information.

In the embodiment of the invention, the D2N link information includes at least one or a combination of the following:

BS information, CSI, SR information, PH information, configuration information, and scheduling information;

Particularly the configuration information related to the D2N link includes at least one or a combination of the following:

Channel configuration information, antenna pattern configuration information, MAC layer parameter configuration information, and physical layer parameter configuration information.

Furthermore the second processing module 62 is configured:

To indicate the link corresponding to the link information to the network side in indication information carried in the link information; or to indicate the link corresponding to the link information to the network side by a resource over which the link information is carried, where the second processing module 62 sends the D2D link information over a first resource allocated by the network side for a D2D link of the UE, and the D2N link information over a second resource allocated by the network side for the D2N link of the UE. Reference can be made to the approach A and the approach B in the method for reporting link information according to the embodiment of the invention for details thereof, so a repeated description thereof will be omitted here.

In an implementation, if there are at least two D2D links of the UE, and the link indicated by the indication information is the D2D link, then the indication information further carries the index of the D2D link; or if there are at least two D2D links of the UE, then for each D2D link, the index of the D2D link is further carried over the first resource configured by the network side.

Furthermore for the BS information of the D2D link and/or the D2N link, the second processing module 62 is configured to report a BSR of the D2D link and/or the D2N link to the network side in an MAC CE, and to indicate the link corresponding to the BSR to the network side using the BSR in the MAC CE, upon determining that a BSR trigger condition of the D2D link and/or the D2N link is satisfied and there is an uplink resource for the D2N link.

Furthermore the second processing module 62 is configured to report BSRs corresponding to the D2D link and the D2N link to the network side in an MAC CE, and to indicate the links corresponding to the BSRs to the network side using the BSRs in the MAC CE, upon determining that BSR trigger conditions of the D2D link and the D2N link are satisfied and there is an uplink resource for the D2N link.

Furthermore the second processing module 62 is configured to indicate the link corresponding to the BSR from an MAC sub-header corresponding to the BSR in the MAC CE, or reserved bits in the MAC CE; or to indicate the link corresponding to the BSR by a Logical Channel Identifier (LCID) field in an MAC sub-header corresponding to the BSR in the MAC CE.

Reference can be made to the first approach and the second approach in the method for reporting link information according to the embodiment of the invention for details thereof, so a repeated description thereof will be omitted here.

Furthermore the first processing module 61 is configured to determine the BS information of the D2D link, and to compose the BSR MAC CE of the D2D link, only according to the data amount of data and control information in a buffer area of the UE to be transmitted over the D2D link; or to determine the BS information of the D2N link, and to compose the BSR MAC CE of the D2N link, only according to the data amount of data and control information in a buffer area of the UE to be transmitted over the D2N link.

Furthermore the first processing module 61 is configured to determine the CSI of the D2D link according to a measurement result of the D2D link.

Furthermore the first processing module 61 is further configured to report UE capability indication information to the network side, and to indicate to the network side in the UE capability indication information that the UE supports D2D communication.

Based upon the same inventive idea, an embodiment of the invention further provides a network-side device, and since the network-side device addresses the problem under the same principle as the method above for receiving link information, reference can be made to the implementation of the method for an implementation of the UE, so a repeated description thereof will be omitted here.

Figure 7:
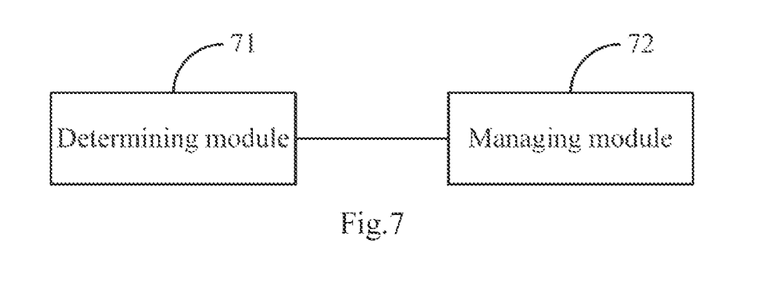

Referring to FIG. 7, an embodiment of the invention provides a network-side device including:

A determining module 71 is configured to receive link information reported by a UE supporting D2D communication, and to determine a link corresponding to the link information, where the link information includes D2D link information and/or D2N link information; and A managing module 72 is configured to manage and schedule the link corresponding to the link information according to the link information.

In the embodiment of the invention, the D2D link information includes at least one or a combination of the following:

BS information, CSI, SR information, PH information, configuration information, and scheduling information;

Particularly the configuration information related to the D2D link includes at least one or a combination of the following:

Channel configuration information, antenna pattern configuration information, MAC layer parameter configuration information, and physical layer parameter configuration information.

In the embodiment of the invention, the D2N link information includes at least one or a combination of the following: BS information, CSI, SR information, PH information, configuration information, and scheduling information. Particularly the configuration information related to the D2N link includes at least one or a combination of the following: channel configuration information, antenna pattern configuration information, MAC layer parameter configuration information, and physical layer parameter configuration information.

Furthermore the determining module 71 is configured to determine the link corresponding to the link information according to indication information carried in the link information; or to determine the link corresponding to the link information according to a resource over which the link information is carried, where the network-side device allocates a first resource for the D2D link of the UE, and a second resource for the D2N link of the UE.

Reference can be made to the approach A and the approach B in the method for reporting link information according to the embodiment of the invention, so a repeated description thereof will be omitted here.

In an implementation, if there are at least two D2D links of the UE, and the link indicated by the indication information is the D2D link, then the indication information further carries the index of the D2D link; or if there are at least two D2D links of the UE, then for each D2D link, the index of the D2D link is further carried over the first resource configured by the network-side device for the UE.

Furthermore for the BS information of the D2D link and/or the D2N link, the determining module 71 is configured to receive a BSR reported by the UE in an MAC CE, and to determine the link corresponding to the BSR from the BSR in the MAC CE.

Furthermore the determining module 71 is configured to determine the link corresponding to the BSR from an MAC sub-header corresponding to the BSR in the MAC CE, or reserved bits in the MAC CE; or to determine the link corresponding to the BSR from an LCID field in an MAC sub-header corresponding to the BSR in the MAC CE.

Furthermore the determining module 71 is configured to receive UE capability indication information reported by the UE, and to determine that the UE supports D2D communication, before allocating the first resource for the D2D link of the UE.

Reference can be made to the first approach and the second approach in the method for reporting link information according to the embodiment of the invention, so a repeated description thereof will be omitted here.

Figure 8:
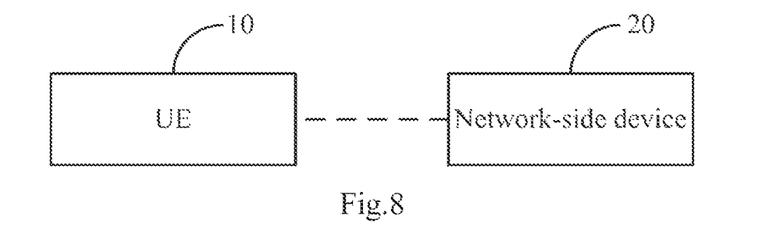

Further to the embodiments above, referring to FIG. 8, an embodiment of the invention further provides a communication system which can perform the flows according to the embodiments above of the invention, where the system includes:

A UE 10 is configured to determine link information to be reported to a network-side device 20; to send the determined link information to the network-side device 20 over a D2N link; and to indicate a link corresponding to the link information to the network-side device 20; and The network-side device 20 is configured to receive the link information reported by the UE 10 supporting D2D communication; to determine the link corresponding to the link information; and to manage and schedule the link corresponding to the link information according to the link information, where the link information includes D2D link information and/or D2N link information.

Figure 9:
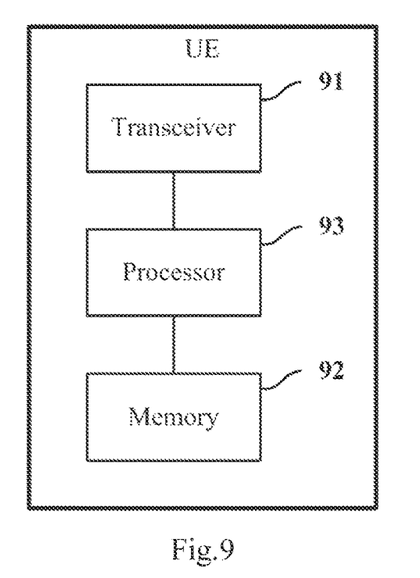
Figure 10:
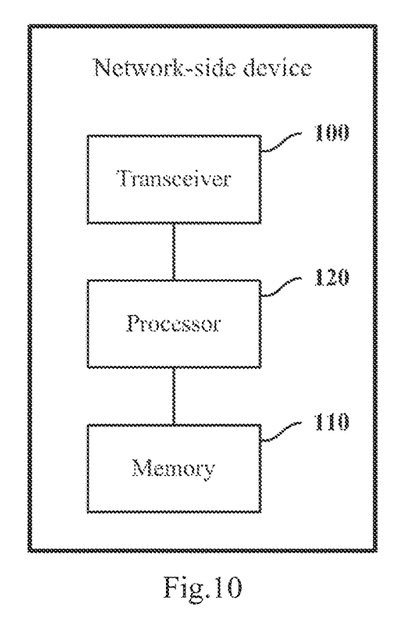

Another embodiment of the invention further provides a UE which can perform the flow according to the embodiment above of the invention. As illustrated in FIG. 9, the UE can include a transceiver 91, a memory 92, and a processor 93, where:

The transceiver 91 can include a baseband processing component, a radio frequency processing component, and other components as needed to transmit related information;

The memory 92 is configured to store one or more executable programs configured to configure the processor; and The processor is configured to be configured with the one or more executable programs, which is configured to perform the following method: determining link information, including D2D link information and/or Device to Network (D2N) link information, to be reported to the network side; sending the determined link information to the network side over a D2N link through the transceiver 91; and indicating a link corresponding to the link information to the network side.

Particularly the processor 93 can indicate the link corresponding to the link information to the network side in indication information carried in the link information; or indicate the link corresponding to the link information to the network side by a resource over which the link information is carried, where transceiver sends the D2D link information over a first resource allocated by the network side for a D2D link of the UE, and the D2N link information over a second resource allocated by the network side for the D2N link of the UE.

Here if there are at least two D2D links of the UE, and the link indicated by the indication information is the D2D link, then the indication information further carries the index of the D2D link to be reported to the network side; or if there are at least two D2D links of the UE, then for each D2D link, the index of the D2D link is further carried over the first resource configured by the network side.

Preferably for the BS information of the D2D link and/or the D2N link, the processor 93 can report a BSR of the D2D link and/or the D2N link to the network side in an MAC CE, and indicate the link corresponding to the BSR to the network side using the BSR in the MAC CE, upon determining that a BSR trigger condition of the D2D link and/or the D2N link is satisfied and there is an uplink resource for the D2N link.

Particularly the processor 93 can report BSRs corresponding to the D2D link and the D2N link to the network side in an MAC CE, and indicate the links corresponding to the BSRs to the network side using the BSRs in the MAC CE, upon determining that BSR trigger conditions of the D2D link and the D2N link are satisfied and there is an uplink resource for the D2N link.

Particularly the processor 93 can indicate the link corresponding to the BSR in an MAC sub-header corresponding to the BSR in the MAC CE, or reserved bits in the MAC CE; or indicate the link corresponding to the BSR in a Logical Channel Identifier (LCID) field in an MAC sub-header corresponding to the BSR in the MAC CE.

Preferably the processor 93 can determine the BS information of the D2D link, and compose the BSR MAC CE of the D2D link, only according to the data amount of data and control information in a buffer area of the UE to be transmitted over the D2D link; or determine the BS information of the D2N link, and compose the BSR MAC CE of the D2N link, only according to the data amount of data and control information in a buffer area of the UE to be transmitted over the D2N link.

Preferably the processor 93 can determine the CSI of the D2D link according to a measurement result of the D2D link.

Preferably the processor 93 can further report UE capability indication information to the network side, and indicate to the network side in the UE capability indication information that the UE supports D2D communication.

Another embodiment of the invention further provides a network-side device which can perform the flow according to the embodiment above of the invention. The network-side device can include a transceiver 100, a memory 110, and a processor 120, where:

The transceiver 100 can include a baseband processing component, a radio frequency processing component, and other components as needed to transmit related information;

The memory 110 is configured to store one or more executable programs configured to configure the processor; and The processor 120 is configured to be configured with the one or more executable programs, which is configured to perform the following method: receiving link information reported by a UE supporting D2D communication through the transceiver; determining a link corresponding to the link information, where the link information includes D2D link information and/or D2N link information; and managing and scheduling the link corresponding to the link information according to the link information.

Preferably the processor 120 can determine the link corresponding to the link information according to indication information carried in the link information; or determine the link corresponding to the link information according to a resource over which the link information is carried, where the network-side device allocates a first resource for the D2D link of the UE, and a second resource for the D2N link of the UE.

Preferably if there are at least two D2D links of the UE, and the link indicated by the indication information is the D2D link, then the indication information further carries the index of the D2D link; or if there are at least two D2D links of the UE, then for each D2D link, the index of the D2D link is further carried over the first resource configured by the network-side device for the UE.

Preferably for the BS information of the D2D link and/or the D2N link, the processor 120 can receive a BSR reported by the UE in an MAC CE, and determine the link corresponding to the BSR from the BSR in the MAC CE.

Here the processor 120 can determine the link corresponding to the BSR from an MAC sub-header corresponding to the BSR in the MAC CE, or reserved bits in the MAC CE; or determine the link corresponding to the BSR from an LCID field in an MAC sub-header corresponding to the BSR in the MAC CE.

Preferably the processor 120 can further receive UE capability indication information reported by the UE, and determine that the UE supports D2D communication, before allocating the first resource for the D2D link of the UE.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for reporting link information, the method comprising:
   determining, by a User Equipment, UE, supporting Device to Device, D2D, communication, link information to be reported to a network side, wherein the link information refers to information related to an established link of the UE, and the link information is a D2D link information or a Device to Network, D2N, link information; and
   reporting, by the UE, the link information to the network side to indicate the established link related to the link information to the network side;
   wherein reporting, by the UE, the link information to the network side to indicate the established link related to the link information to the network side comprises:
   when the UE determines that the D2D link information is to be reported, reporting the D2D link information to the network side over a first resource, to indicate that the established link related to the D2D link information is an established D2D link, and when the UE determines that the D2N link information is to be reported, reporting the D2N link information to the network side over a second resource, to indicate that the established link corresponding to the D2N link information is an established D2N link, wherein the first resource is a resource allocated by the network side for an established D2D link of the UE and the second resource is a resource allocated by the network side for an established D2N link of the UE; or
   when the UE determines that the D2D link information is to be reported, reporting the D2D link information comprising a first indication information to the network side, to indicate that the established link related to the D2D link information is an established D2D link, and when the UE determines that the D2link information is to be reported, reporting the D2N link information comprising a second indication information to the network side, to indicate that the established link corresponding to the D2N link information is an established D2N link, wherein the first indication information is an information indicating that the established link related to the D2D link information is an established D2D link, and the second indication information is an information indicating that the established link corresponding to the D2N link information is an established D2link.

2. The method according to claim 1, wherein the first resource comprises one or a combination of: a time-domain resource, a frequency-domain resource, a space-domain resource, and a code-domain resource; and
   the second resource comprises one or a combination of: a time-domain resource, a frequency-domain resource, a space-domain resource, and a code-domain resource.

3. The method according to claim 2, wherein:
   if there are at least two D2D links of the UE, and the indication information carried in the link information indicates the D2D link corresponding to the link information, then the indication information further carries an index of the D2D link corresponding to the link information; or
   if there are at least two D2D links of the UE, and the UE reports the link information over the first resource to indicate the D2D link corresponding to the link information, then an index of the D2D link corresponding to the link information is further carried over the first resource.

4. The method according to claim 1, wherein:
   the D2D link information comprises one or a combination of: Buffer State, BS, information, Channel State Information, CSI, Scheduling Request, SR, information, Power Headroom, PH, information, configuration information, and scheduling information; and
   the D2N link information comprises one or a combination of: Buffer State, BS, information, Channel State Information, CSI, Scheduling Request, SR, information, Power Headroom, PH, information, configuration information, and scheduling information;
   wherein the configuration information comprises one or a combination of:
   channel configuration information, antenna pattern configuration information, Media Access Control, MAC, layer parameter configuration information, and physical layer parameter configuration information.

5. The method according to claim 2, wherein determining, by the UE supporting D2D communication, the link information to be reported to the network side comprises:
   determining, by the UE, that BS information of the established link corresponding to the link information is to be reported to the network side, upon determining that the established link corresponding to the link information satisfies a Buffer State Report, BSR, trigger condition of the established link corresponding to the link information and there is an uplink resource for reporting the link information; and
   reporting, by the UE, the link information to the network side to indicate the established link related to the link information to the network side comprises:
   reporting, by the UE, a BSR of the established link corresponding to the link information to the network side in a Media Access Control, MAC, Control Element, CE, to indicate the link corresponding to the BSR to the network side using the BSR in the MAC CE.

6. The method according to claim 5, wherein the UE reports a first BSR corresponding to a D2D link and a second BSR corresponding to a D2N link to the network side in an MAC CE to indicate the D2D link corresponding to the first BSR and the D2N link corresponding to the second BSR, to the network side using the first BSR and the second BSR in the MAC CE, upon determining that BSR trigger conditions of the D2D link corresponding to the first BSR and the D2N link corresponding to the second BSR are satisfied and there is an uplink resource for reporting the first BSR and the second BSR.

7. The method according to claim 5, wherein reporting, by the UE, the BSR of the established link corresponding to the link information to the network side in the MAC CE to indicate the established link corresponding to the BSR to the network side using the BSR in the MAC CE comprises:
- reporting, by the UE, the BSR of the established link corresponding to the link information to the network side in the MAC CE to indicate the established link corresponding to the BSR, in an MAC sub-header corresponding to the BSR in the MAC CE, or reserved bits in the MAC CE; or
- reporting, by the UE, the BSR of the established link corresponding to the link information to the network side in the MAC CE to indicate the established link corresponding to the BSR, in a Logical Channel Identifier, LCID, field in an MAC sub-header corresponding to the BSR in the MAC CE;
- wherein the UE determines the BS information of the D2D link, and composes BSR MAC CE of the D2D link, only according to a data amount of data and control information in a buffer area of the UE to be transmitted over the D2D link, upon determining that the link information of the D2D link satisfying the trigger condition is to be reported to the network side; or
- the UE determines the BS information of the D2N link, and composes BSR MAC CE of the D2N link, only according to a data amount of data and control information in a buffer area of the UE to be transmitted over the D2N link, upon determining that the link information of the D2N link satisfying the trigger condition is needs to be reported to the network side.

8. The method according to claim 1, wherein the method further comprises:
- reporting, by the UE, UE capability indication information to the network side, and indicating to the network side in the UE capability indication information that the UE supports D2D communication.

9. A method for receiving link information, the method comprising:
- receiving, by a network side, link information reported by a User Equipment, UE, supporting Device to Device, D2D, communication, and determining an established link of the UE corresponding to the link information, wherein the link information refers to information related to the established link and the link information is D2D link information or Device to Network, D2N link information; and
- managing and scheduling, by the network side, the established link corresponding to the link information according to the link information;
- wherein determining, by the network side, the established link corresponding to the link information comprises:
- determining, by the network side, the established link corresponding to the link information according to indication information carried in the link information, wherein the network side determines that the established link corresponding to the D2D link information is a D2D link when the network side receives the D2D link information reported by the UE, and the network side determines that the established link corresponding to the D2N link information is a D2N link when the network side receives the D2N link information reported by the UE, wherein the first indication information is an information indicating that the established link related to the D2D link information is an established D2D link, and the second indication information is an information indicating that the established link corresponding to the D2N link information is an established D2N link; or
- determining, by the network side, the established link corresponding to the link information according to a resource over which the link information is carried, wherein the network side determines that the established link corresponding to the D2D link information is a D2D link when the network side receives the D2D link information over the first resource, and that the established link corresponding to the D2N link information is a D2N link when the network side receives the D2N link information over the second resource; wherein the first resource is a resource allocated by the network side for an established D2D link of the UE and the second resource is a resource allocated by the network side for an established D2N link of the UE.

10. The method according to claim 9, wherein:
- the D2D link information comprises one or a combination of: Buffer State, BS, information, Channel State Information, CSI, Scheduling Request, SR, information, Power Headroom, PH, information, configuration information, and scheduling information; and
- the D2N link information comprises one or a combination of: Buffer State, BS, information, Channel State Information, CSI, Scheduling Request, SR, information, Power Headroom, PH, information, configuration information, and scheduling information;
- wherein the configuration information comprises one or a combination of:
- channel configuration information, antenna pattern configuration information, Media Access Control, MAC, layer parameter configuration information, and physical layer parameter configuration information.

11. The method according to claim 9, wherein receiving, by the network side, the link information reported by the UE and determining the established link corresponding to the link information comprises:
- receiving, by the network side, a BSR reported by the UE in an MAC CE, and determining, by the network side, the established link corresponding to the link information according to the BSR in the MAC CE.

12. The method according to claim 11, wherein determining, by the network side, the established link corresponding to the link information according to the BSR in the MAC CE comprises:
- determining, by the network side, the established link corresponding to the link information according to an MAC sub-header corresponding to the BSR in the MAC CE, or reserved bits in the MAC CE; or
- determining, by the network side, the established link corresponding to the link information according to an LCID field in an MAC sub-header corresponding to the BSR in the MAC CE.

13. A User Equipment, UE, comprising:
- a first processing module configured to determine link information to be reported to a network side, wherein the link information refers to information related to an established link of the UE, and the link information is a D2D link information or a Device to Network, D2N, link information; and
- a second processing module configured to report the link information to the network side to indicate the established link related to the link information to the network side;
- wherein the second processing module is configured:
- when the UE determines that the D2D link information is to be reported, report the D2D link information to the network side over a first resource, to indicate that the established link related to the D2D link information is an established D2D link, and when the UE determines that the D2N link information is to be reported, report the D2N link information to the network side over a second resource, to indicate that the established link corresponding to the D2N link information is an established D2N link, wherein the first resource is a resource allocated by the network side for an established D2D link of the UE and the second resource is a resource allocated by the network side for an established D2N link of the UE; or when the UE determines that the D2D link information is to be reported, report the D2D link information comprising a first indication information to the network side, to indicate that the established link related to the D2D link information is an established D2D link, and when the UE determines that the D2N link information is to be reported, report the D2N link information comprising a second indication information to the network side, to indicate that the established link corresponding to the D2N link information is an established D2N link, wherein the first indication information is an information indicating that the established link related to the D2D link information is an established D2D link, and the second indication information is an information indicating that the established link corresponding to the D2N link information is an established D2N link.

14. The UE according to claim 13, wherein:
if there are at least two D2D links of the UE, and the indication information carried in the link information indicates the D2D link corresponding to the link information, then the indication information further carries an index of the D2D link corresponding to the link information; or
if there are at least two D2D links of the UE, and the second processing module reports the link information over the first resource to indicate the D2D link corresponding to the link information, then an index of the D2D link corresponding to the link information is further carried over the first resource.

15. The UE according to claim 13, wherein,
the first processing module is configured to determine that BS information of the established link corresponding to the link information is to be reported to the network side, upon determining that the established link corresponding to the link information satisfies a Buffer State Report, BSR, trigger condition of the established link corresponding to the link information and there is an uplink resource for reporting the link information;
the second processing module is configured to report a BSR of the established link corresponding to the link information to the network side in a Media Access Control, MAC, Control Element, CE to indicate the established link corresponding to the BSR to the network side using the BSR in the MAC CE.

16. The UE according to claim 15, wherein the second processing module is configured to:
report a first BSR corresponding to a D2D link and a second BSR corresponding to a D2N link to the network side in an MAC CE to indicate the D2D link corresponding to the first BSR and the D2N link corresponding to the second BSR, to the network side using the first BSR and the second BSR in the MAC CE, upon determining that BSR trigger conditions of the D2D link corresponding to the first BSR and the D2N link corresponding to the second BSR are satisfied and there is an uplink resource for reporting the first BSR and the second BSR.

17. The UE according to claim 15, wherein the second processing module is configured:
report the BSR of the established link corresponding to the link information to the network side in a Media Access Control, MAC, Control Element, CE to indicate the established link corresponding to the BSR in an MAC sub-header corresponding to the BSR in the MAC CE, or reserved bits in the MAC CE; or
report the BSR of the established link corresponding to the link information to the network side in the MAC CE to indicate the established link corresponding to the BSR in a Logical Channel Identifier, LCID, field in an MAC sub-header corresponding to the BSR in the MAC CE;
wherein the first processing module is configured:
to determine the BS information of the D2D link, and to compose BSR MAC CE of the D2D link, only according to a data amount of data and control information in a buffer area of the UE to be transmitted over the D2D link; or
to determine the BS information of the D2N link, and to compose BSR MAC CE of the D2N link, only according to a data amount of data and control information in a buffer area of the UE to be transmitted over the D2N link.

18. The UE according to claim 13, wherein the first processing module is further configured:
to report UE capability indication information to the network side, and to indicate to the network side in the UE capability indication information that the UE supports D2D communication.

* * * * *